No. 714,121. Patented Nov. 18, 1902.
G. H. WILLIAMS.
BICYCLE.
(Application filed July 26, 1901.)
(No Model.)
Fig. I
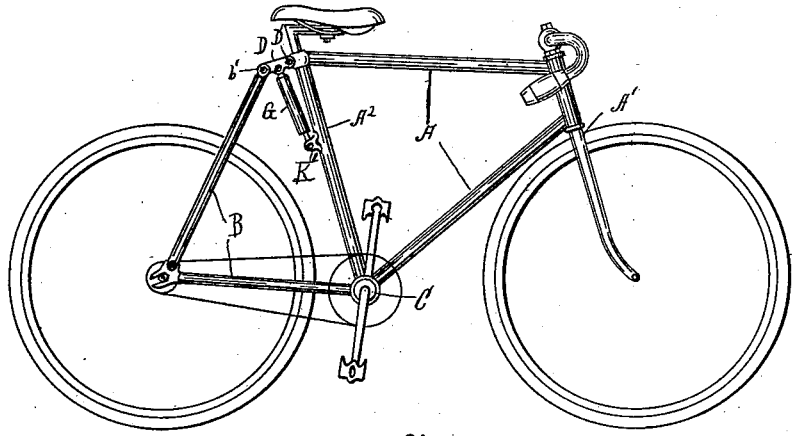
Fig. II
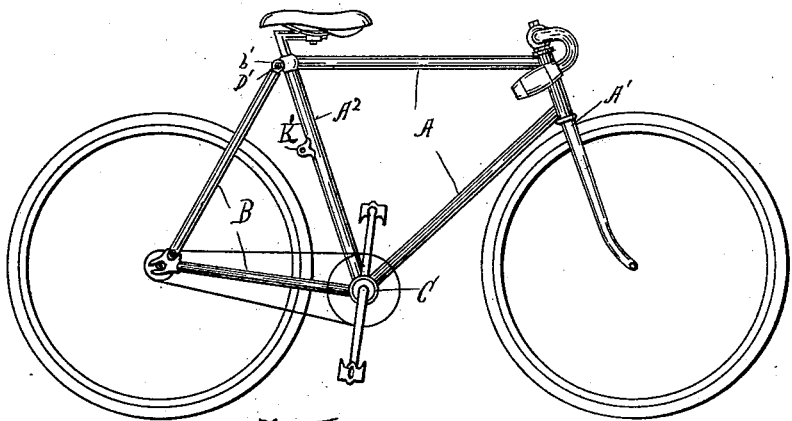
Fig. IV
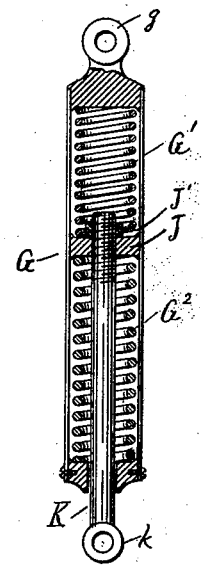
Fig. III
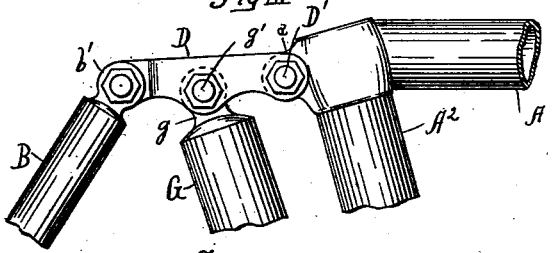
Fig. V
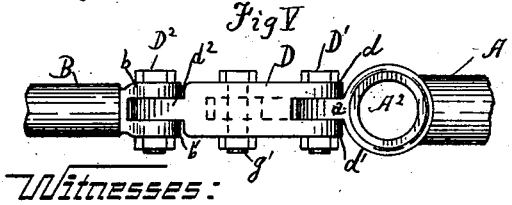
Witnesses:
A. L. Lord.
E. B. Dannelly.
Inventor:
Gurdon H. Williams
by W. E. Donnelly
his Atty
THE NORRIS PETERS CO., PHOTO-LITHO., WASHINGTON, D. C.

UNITED STATES PATENT OFFICE.

GURDON H. WILLIAMS, OF BROOKLYN TOWNSHIP, OHIO.

BICYCLE.

SPECIFICATION forming part of Letters Patent No. 714,121, dated November 18, 1902.

Application filed July 26, 1901. Serial No. 69,816. (No model.)

*To all whom it may concern:*

Be it known that I, GURDON H. WILLIAMS, a citizen of the United States, residing at Brooklyn township, in the county of Cuyahoga and State of Ohio, have invented certain new and useful Improvements in Bicycles; and I hereby declare the following to be a full, clear, and exact description of the invention, such as will enable others skilled in the art to which it pertains to make and use the same.

My invention relates to bicycles.

The object of my invention is to provide a bicycle by means of which the bicycle may be provided with a spring-cushion to take up the jolts or jars when riding on uneven roads and also whereby the bicycle may be provided with said cushioning device or not, at the option of the rider, or, in other words, to provide the bicycle with a spring-cushioning device which is detachably attached to the bicycle.

Another object of my invention is to provide a spring-cushioning device at such a position on the machine as that the results obtained are of the best, while adding very little, if anything, to the weight of the machine.

My invention consists in providing a bicycle to the rear of the seat-post with a cushioning-spring, one end of which is secured to said seat-post and the other end is secured to a link located intermediate between the upper end of said seat-post and the upper end of the rear frame, upon which the rear wheel of the bicycle is mounted, said rear frame being in turn hinged to the forward frame of the bicycle at its lower end.

My invention also consists in providing a link between the upper ends of both hinged frames, connecting one with the other at said upper end, in combination with a cushioning device or spring attached at one end to said link and at the other end to the forward frame and in making said link and said cushioning device detachable.

My invention also consists in other features and details of construction, which will be hereinafter fully set forth and claimed.

In the drawings, Figure I is a view in side elevation of a man's bicycle, illustrating the same with my cushioning device secured in position. Fig. II is a view in side elevation of a man's bicycle, illustrating the same as it appears with the cushioning device removed.
Fig. III is a segmental view illustrating the upper end of the rear frame, the upper end of the seat-post, the link connecting the two, and the upper end of the cushioning device connected to said link; and Fig. IV is a view in top plan of the same. Fig. V is a longitudinal vertical section taken through the cushioning device as I prefer to construct it.

A represents the forward frame of a bicycle, which is provided with the usual steering-fork A' and other necessary adjuncts of a practical bicycle and in which the forward wheel of the bicycle is mounted and operates.

B represents the rear frame of a bicycle, which provides the journal for the rear wheel of the bicycle. This frame B is hinged to the frame A in any suitable manner at the point C, preferably—viz., at a point in juxtaposition to the journals of the pedal-shaft and driving sprocket-wheel shaft. This is desirable, but is not absolutely essential as far as exact location is concerned, it only being essential that the pivot-point between the two frames be located at or near the pedals.

D represents a link, which is shown more clearly in Figs. III and IV, whereby the upper ends of the frame A at or near the upper end of the seat-post and the upper end of the rear frame B are hinged together. The construction of this link D is shown in Fig. V as having at one end a two-part knuckle $d\ d'$, which engages with the knuckle $a$, in turn permanently secured to the upper end of the seat-post $A^2$, the knuckle $a$ resting between the two-part knuckle $d\ d'$ and the parts being secured together by means of a pintle-bolt D'. The opposite end of the link D is provided with a single knuckle-piece $d^2$, which rests between a two-part knuckle-piece $b\ b'$, secured together by means of a pintle $D^2$ at the upper end of the frame B. It will also be seen that the construction of the knuckles $b$, $b'$, $d^2$, $d$, $d'$, and $a$ is such that when the link D is removed the knuckles $b$ and $b'$ will receive the knuckles $a$, and thus the rear frame and the forward frame may be secured together, as illustrated in Fig. II, by means of the pintle-bolt D', doing away with the use of the link and the cushioning device. The object of this is that in case of accident to the cushioning device or any of its parts the same may be removed and the bicycle be in condition to be operated, and also where it is desired to dispense with the cushioning device the same can be removed and the bicycle used without it.

To the central portion of the link D is secured the upper end of the cushioning device G, which is preferably formed as follows: Within the casing G (see Fig. IV) I place two springs G' and G². The former, the upper one, is made somewhat lighter than the lower one, G². Interposed between the two springs is a disk piston J, which has a free movement within the casing G, and it is adjustably attached by means of a male and female screw and a lock-nut J' to a piston-rod K, the object being to adjust the length of the cushioning device and the tension of the spring G². The upper and lower ends of the casing G are closed in any suitable manner to confine the springs G' and G² and allow the piston-rod K to move within said casing, the same being controlled by the disk J and the springs G' and G² in either direction, according to the stress or direction of the thrust between the forward and rear frames of the bicycle.

The upper end of the casing G is secured to the link D by means of an eye $g$ and a pintle-bolt $g'$, and the lower end of the piston-rod K is provided with an eye $k$, whereby it is pivotally secured to a clip K', which in turn is attached to the seat-post A².

All of the pintle-bolts securing the above-mentioned parts together are removably secured in position that the parts may be removed, if desired, and the machine adjusted either as in Figs. I and II, or the parts may be replaced if they become broken or disarranged.

The operation of the mechanism will be clearly understood by reference to the drawings and the action of the cushioning device by reference to Figs. I, III, and IV.

It will be seen that the downward pressure on the seat-post A² will elongate the spring-cushioning device by compressing the spring G², and the reaction will be taken up by the spring G', thus cushioning the connection between the frames A and B and making a very easy riding wheel.

By my construction I attain an economical, interchangeable, and serviceable cushioning device for bicycles without in any way weakening the parts of the wheel, while at the same time the construction of the wheel is such that it may be used with or without said cushioning device.

In setting forth my invention I have deemed it advisable to show and set forth a construction which is in every way adapted to the carrying out of the invention and the objects of the same; but in doing so I am well aware of the fact that these exact details of construction are not absolutely essential, but may be altered within certain limits without departing from my invention, the objects of which have been hereinbefore set forth.

What I claim is—

1. A bicycle, comprising rear brace-bars terminating at their upper portions in a single bifurcated bar and a seat-post provided with a rearwardly-extending knuckle, in combination with a link pivotally connected to the said brace-bars and seat-post, said link having its forward end bifurcated to embrace the said knuckle, and its rear end provided with a reduced portion, to fit within the bifurcated end of the said brace-bars, and a cushioning mechanism secured at one of its ends to said link, and at its other end to the bicycle-frame.

2. In combination with the frame of a bicycle comprising two parts hinged together at their lower ends, and a link pivotally connecting the parts at their upper ends, of a cushioning mechanism including a casing provided at its upper closed end with an integral eye and pivotally connected to the link intermediate its ends, a pair of cushioning-springs within the casing, one of greater tension than the other, and a disk mounted in the casing between the adjacent ends of the springs and slidable in said casing, and a piston-rod connected at its upper end to the disk and at its lower end pivotally connected to the seat-post of the frame, as and for the purpose set forth.

3. In a bicycle, the combination with the frame comprising two sections hinged together at the lower portions and a link pivotally secured to both sections at their upper ends, of a cushioning mechanism, comprising a casing pivotally connected to the said link, a pair of springs disposed one above the other within the casing, a disk within the casing between the said springs and provided with an internally-screw-threaded bore, and a piston-rod having its inner end externally screw-threaded to register with threaded bore of the disk whereby the tension of the springs can be regulated, said piston-rod having its outer end pivotally connected to the seat-post of the frame.

4. In a bicycle, the combination with the frame comprising two sections hinged together at their lower portions, a bracket secured to the forward section and a link pivotally secured to both sections at their upper ends, of a cushioning mechanism comprising a casing provided at its upper closed end with an eye and pivotally connected to the said link, a piston within the casing, the outer end of said piston provided with an eye and pivotally connected thereby to the bracket of the frame, a disk on the upper end of said piston, and springs interposed within the casing above and below the said disk.

Signed by me at Cleveland, in the county of Cuyahoga and State of Ohio, this 13th day of April, 1901.

GURDON H. WILLIAMS.

Witnesses:
W. E. DONNELLY,
E. B. DONNELLY.